United States Patent [19]
Dancausse et al.

[11] Patent Number: 5,686,052
[45] Date of Patent: Nov. 11, 1997

[54] PROCESS FOR THE TREATMENT OF NUCLEAR TARGETS AND/OR FUELS BASED ON METALLIC ALUMINIUM BY TETRAMETHYLAMMONIUM HYDROXIDE SOLUTIONS

[75] Inventors: Jean-Philippe Dancausse, Laudun; Georges Armengol, Orange; Serge Caron, Pont Saint-Esprit, all of France

[73] Assignee: Commissariat a l'Energie Atomique, Paris, France

[21] Appl. No.: 715,092

[22] Filed: Sep. 17, 1996

[30] Foreign Application Priority Data

Sep. 22, 1995 [FR] France .................. 95 11160

[51] Int. Cl.⁶ .................. C22B 60/00
[52] U.S. Cl. .................. 423/4; 423/20; 976/DIG. 278
[58] Field of Search .................. 423/4, 20; 976/DIG. 278

[56] References Cited

U.S. PATENT DOCUMENTS

| | | | |
|---|---|---|---|
| 2,891,840 | 6/1959 | Curtis | 423/4 |
| 2,893,863 | 7/1959 | Flox | 423/520 |
| 2,901,343 | 8/1959 | Peterson | 75/398 |
| 3,022,160 | 2/1962 | Brandt | 216/102 |
| 3,222,125 | 12/1965 | Schulz | 423/20 |
| 3,251,645 | 5/1966 | Guthrie | 423/4 |
| 3,273,973 | 9/1966 | Thoma, Jr. et al. | 423/4 |
| 3,282,655 | 11/1966 | Case et al. | 423/4 |
| 3,409,413 | 11/1968 | Burns et al. | 423/4 |

FOREIGN PATENT DOCUMENTS 2 011 697  7/1979  United Kingdom.

OTHER PUBLICATIONS

Database WPI, Derwent Publications, AN-92-109355, JP-A-04050699, Feb. 19, 1992.
Patent Abstracts of Japan, vol. 17, No. 97 (E-1326), JP-A-42 288823, Oct. 13, 1992.
Database WPI, Derwent Publications, AN-85 139098, JP-A-60 075 590, Apr. 27, 1985.
Database WPI, Derwent Publications, AN-79-84976B, JP-A-54 132170, Oct. 13, 1979.
Database WPI, Derwent Publications, AN-86-064387, JP-A-61014705, Jan. 22, 1986.

*Primary Examiner*—Ngoclan Mai
*Attorney, Agent, or Firm*—Oblon, Spivak, McClelland, Maier & Neustadt, P.C.

[57] ABSTRACT

The invention relates to a process for the processing of nuclear targets and/or fuels based on metallic aluminium by dissolving with the aid of aqueous tetramethylammonium hydroxide (TMAOH) solutions.

Dissolving can consist of a total dissolving in a single stage of the core and the can of the nuclear fuel by TMAOH or a decanning of the can by TMAOH, followed by a nitric dissolving of the core. The use of TMAOH eliminates the disadvantages associated with dissolving in a concentrated nitric or sodium medium and decanning with soda and in particular permits the easy vitrification of the effluents produced by the process.

24 Claims, 2 Drawing Sheets

PROCESS FOR THE TREATMENT OF NUCLEAR TARGETS AND/OR FUELS BASED ON METALLIC ALUMINIUM BY TETRAMETHYLAMMONIUM HYDROXIDE SOLUTIONS

The present invention relates to a process for the treatment of nuclear targets and/or fuels based on metallic aluminium, in which the nuclear targets and/or fuels undergo at least one dissolving operation by a dissolving medium comprising tetramethylammonium hydroxide.

The dissolving of nuclear fuels is an operation more particularly carried out within the framework of the reprocessing of nuclear fuel and targets based on metallic aluminium and radioactive materials in metallic form.

Aluminium-based fuels comprise a can made from metallic aluminium and a core constituted by an intimate mixture of aluminium and radioactive elements, the targets being the assemblies containing the nuclear materials which, under the action of neutrons, make it possible to generate in preferred manner certain radioisotopes. The assembly is then dissolved so that the latter can be separated and purified by separative chemistry with respect to the other elements present.

The processes used at present for the reprocessing of fuels and/or targets based on aluminium are based either on their total dissolving, with regards to both the can and the core, in a concentrated sodium or nitric medium, or their decanning with soda, the dissolving then being limited to the can, followed by dissolving in a nitric medium of the core. The processes generate hydrogen, which must be eliminated by gas scavenging or by adding sodium nitrate during the operation, in the case of sodium decanning and dissolving operations. The dissolving of nuclear fuels based on aluminium leads to particular problems. Thus, it is known that aluminum and certain of its alloys are resistant to the action of the known acid solutions and in particular nitric acid, due to the surface formation of a resistant oxide layer.

Therefore, the total dissolving in an acid (nitric) medium of aluminium-based fuels must take place hot using mixtures of acid, such as e.g. aqua regia constituted by a mixture of nitric acid and hydrochloric acid ($HNO_3$/HCl). It has also been proposed to make use of nitric acid to which sulphuric acid has been added. The latter increases the dissolving of the aluminum, but as a result of the low solubility of the aluminium sulphate in the nitric acid, said process is difficult to perform. Small hydrofluoric acid quantities improve the dissolving of the aluminium, but then the fluoride ions are complexed by the aluminium and the reaction becomes extremely slow.

The dissolving by nitric acid of nuclear fuels containing aluminium consequently require the presence of a mercury catalyst constituted by Hg II ion and e.g. present in the form of mercuric nitrate ($Hg(NO_3)_2$) or mercuric fluoride ($HgF_2$). This method has been used since the early 1950's and is based on the fact that the mercury reacts with the surface oxide layer and forms an aluminium-mercury amalgam, which very easily dissolves in nitric acid. However, this reaction has the serious disadvantage of being highly exothermic and producing a large quantity of froth and foam. Dissolving also leads to the presence of large amounts of mercury in the effluents produced which, as a result of the toxicity of this element, requires supplementary treatment and processing stages such as precipitation and filtration stages. In order to obviate the disadvantages of the mercury-catalyzed nitric acid processes, a proposal has been made to use fluoroboric acid for dissolving aluminium-based nuclear fuels, but although the reaction is less exothermic and produces less foam, it is much slower and the dissolving rates are inadequate compared with the conventional process using nitric acid catalyzed by mercury (Hg II).

Processes involving the total dissolving of the can and core, without decanning the aluminium envelope, with the aid of a nitric acid-based solution, offer the advantage of being carried out in a single stage. However, it is common to these processes that the solution volume necessary for dissolving is imposed by the solubility limit of the aluminium nitrate, which is approximately 2 moles/l. This constraint makes it necessary to work with large dissolving solution volumes of in practice 100 liters of 8N nitric acid for 5 kg of aluminium and with solutions containing a very large amount of aluminium nitrate and which are consequently very viscous. Moreover, the medium activity (MA) effluents produced, apart from the possible presence of mercury, are saline and voluminous.

The dissolving by soda of nuclear targets and/or fuels based on aluminium is based on the fact that aluminium is vigorously attacked by soda in the form of boiling solutions at concentrations of 5 to 50 wt. % in order to give an aluminate in accordance with the reaction $Al+NaOH+H_2O \rightarrow NaAlO_2+3/2H_2$.

The advantages of sodium dissolving are a high aluminium solubility able to reach 5 mole/liter and the selective solubilization of certain fission products such as Cs, I, Zr and Nb.

The formation of large amounts of dihydrogen must be reduced, because it leads to a significant risk of explosion and the dissemination of radioactive material, so that the presence of nitrate (in the form of sodium nitrate) or nitrite ions in a sufficient quantity or an adequate gas scavenging makes it possible to almost entirely eliminate the risk associated with dihydrogen generation.

The disadvantages of dissolving by soda, no matter what the variant of the process used, are the risk of partly dissolving actinides and the presence of sodium. Thus, the sodium quantity authorized for the subsequent vitrification imposes the control of the quantities used in the processes of the cycle of the fuel.

The dissolving by soda must either be a total dissolving relative both to the can and the core of the fuel, or a sodium decanning of the can, followed by a nitric dissolving of the core. In the two variants of the sodium dissolving process, the latter involves a second nitric redissolving stage for the solid phase obtained and separated during the first stage with the production of a high activity (HA) solution.

The total dissolving by a soda solution of the aluminium contained in a fuel both in the can and in the core offers the advantages of permitting a precipitation of actinides, certain fission products and certain lanthanides in the form of hydroxides, whereas the aluminium remains in solution. Moreover, the process can then be continued with processing stages based on the use of specific extractants making it possible to avoid the addition of salting out agents ($LINO_3$, $Al(NO_3)_3$) to the solution. The redissolving of the solid phase also requires a small $HNO_3$ volume.

Apart from the disadvantages referred to hereinbefore, total sodium dissolving also has specific disadvantages, more particularly linked with the difficulties encountered in filtering hydroxides and the ageing of said hydroxides which can make difficult their redissolving.

In this variant of the sodium dissolving process there is also a risk of a part of the actinides passing into solution and thus alpha contaminating the basic solution, thus rendering it impossible to downgrade it as MA effluent.

The sodium decanning of the fuel can followed by a nitric dissolving of the core, which is a procedure derived from total dissolving, has the advantage of producing a basic, non-alpha-contaminated solution and manageable as a medium activity or MA effluent. However, it suffers from the disadvantages resulting from the presence in solution of activation products, the need to use a larger solid phase nitric redissolving volume than in the case of total dissolving and finally the need to carry out nitric dissolving of the core in the presence of a catalyst such as ammonium fluoride ($NH_4F$).

In the light of what has been stated hereinbefore, the known processes for the dissolving of nuclear targets and/or fuels based on aluminium remain unsatisfactory in numerous respects, both with regards to nitric dissolving processes and sodium dissolving processes.

There is consequently a need for a process permitting the processing and more specifically the dissolving of nuclear targets and/or fuels based on aluminium, in which the dissolving of the fuel is easy, the dissolving reaction is not very exothermic and causes no problem such as the excessive generation of foam. The dissolving reaction kinetics must also be fast, the reagents used must be economic and easy to implement, the passing into solution of the actinides must be reduced to a minimum and the products formed during dissolving must be easy to separate. It is also desirable for the effluents produced not to contain sodium and consequently are subsequently easily vitrified and for the volume of high activity effluents to be reduced.

According to the invention, these and other objectives are achieved by a process for the processing of nuclear targets and/or fuels based on metallic aluminium and radioactive materials in metallic form, in which the nuclear targets and/or fuels undergo at least one dissolving operation, characterized in that the dissolving medium comprises tetramethylammonium hydroxide.

The tetramethylammonium hydroxide or TMAOH of semi-developed formula $(CH_3)_4NOH$ is a quaternary amine and has the properties of a strong base. Thus, like soda, it is easily carbonated. It is marketed in the form of a solid pentahydrate TMAOH, $5H_2O$ (M=181.23 g). As it is a subcutaneous poison, which is very caustic and irritating for the skin, eyes and mucous membranes, it must be handled wearing gloves under a fume hood. The degradation products obtained by heating are $(CH_3)_3N$, $CH_3OH$, $NO_x$ and $NH_3$. The $TMANO_3$ salt obtained by reaction between TMAOH and $HNO_3$ followed by a dry evaporation is very flammable, like $NH_4NO_3$.

The use of TMAOH for dissolving aluminium and/or actinides is neither mentioned, nor suggested in the literature. TMAOH in aqueous solution form easily dissolves the aluminium contained in fuels and targets in the same way as the soda solutions currently used for this purpose, but has the supplementary advantage of not generating medium activity (MA) effluents containing sodium and causing problems during a subsequent vitrification.

Moreover, the dissolving kinetics of nuclear fuels and targets based on aluminium by TMAOH solutions is sufficiently fast to cause no performance problems. This reaction is also very moderately exothermic and consequently requires no precautions linked with the generated heat dissipation. It would therefore appear that TMAOH fulfils all the conditions and satisfies all the requirements to be fulfilled by a dissolving agent for nuclear targets and/or fuels and, compared with total dissolving and soda decanning, has the decisive supplementary advantage of eliminating the presence of sodium.

In addition, the tetramethylammonium hydroxide is decomposed by heating at a not very high temperature close to 200° C. to give products which can be easily eliminated and referred to hereinbefore and does not give insoluble products giving rise to the supplementary problem of new waste produced.

Unlike soda, the dissolving operation of a nuclear fuel incorporating a metallic aluminium can and a core formed by an intimate mixture of aluminium and radioactive elements by a dissolving medium comprising TMAOH can involve, according to a first variant of the process according to the invention, a single stage of the total dissolving of the core and can of nuclear material in the dissolving medium comprising TMAOH or can, in a second variant of the process according to the invention, involve a first stage of decanning the can by the dissolving medium constituted by TMAOH, followed by the nitric dissolving of the core.

BRIEF DESCRIPTION OF THE DRAWINGS

Other features and advantages of the invention can be gathered from studying the following description given in an illustrative and non-limitative form, with reference to the attached drawings, wherein show.

Figure 1:
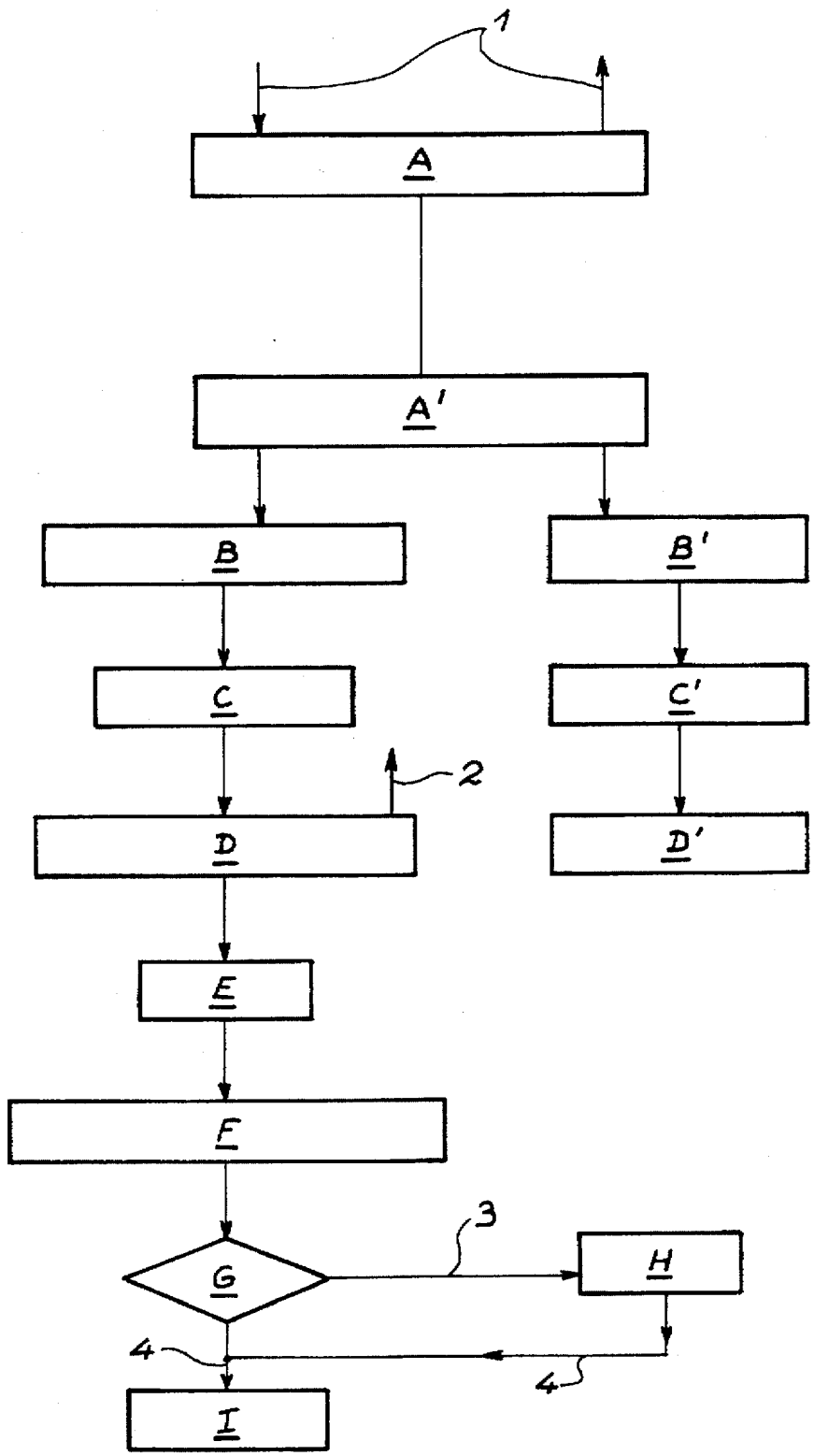
FIG. 1 A diagram representing the stages of the dissolving and processing process according to the invention, in its first variant.

On referring to FIG. 1, it can be seen that the process according to the invention firstly involves a first stage (A) during which the aluminium-based nuclear fuel, which is constituted in conventional manner by an aluminium can and a core containing aluminium, actinides, fission products such as Zr, Nb, Ru, Cs and lanthanides is subject to the action of a solution, preferably an aqueous solution of tetramethylammonium hydroxide. The fuel to be dissolved preferably comprises by weight 90 to 95% aluminium, 5 to 10% actinides, fission products and lanthanides. The aqueous TMAOH solution preferably has a concentration between 2.5 and 4.0 mole/liter, the preferred concentration being 4.0 mole/liter and the solution volume used is generally 5 to 40 liters, preferably 10 to 30 liters and more preferably 15 to 25 liters per kg of treated fuel.

Dissolving generally takes place at a temperature between 40 and 95° C. and preferably between 70° and 90° C. and dissolving generally lasts between 40 and 800 minutes, preferably between 50 minutes, e.g. at 90° C. and 700 minutes, e.g. at 30° C.

All the dissolving parameter values are only given for information. It is obvious that the values of these parameters can be easily determined by the expert, in particular as a function of the nature of the nuclear fuel to be dissolved.

Dissolving preferably takes place under gas scavenging (1), e.g. air, nitrogen or argon scavenging, performed on the top of the dissolving reactor in order to limit the dihydrogen quantity generated during aluminium dissolving and thus reduce the explosion risks associated with the presence of dihydrogen whose level must be below 3%.

The product obtained at the end of dissolving stage (A) then undergoes a solid-liquid separation (A'), preferably involving centrifuging. This separation takes place easily and this leads on the one hand to a basic liquid phase (B), which contains the aluminium in the form of the aluminate $TMAAlO_2$ in a concentration of 30 to 90 g/l, as well as fission products soluble in a basic medium, traces of actinides and lanthanides, at a concentration below 1% for the actinides, and on the other hand a solid phase (B') containing virtually all the actinides and lanthanides, particularly uranium, as well as a part of the fission products insoluble in the basic medium, said products being in the form of insoluble oxides and hydroxides.

The thus obtained solid product is rapidly dissolved at a temperature e.g. between 50 and 105° C. in nitric acid (C'). This dissolving is in accordance with the process of the invention a quantitative dissolving of said generally actinide-rich, solid phase, which is e.g. performed in a small, e.g. 6N, concentrated nitric acid volume, preferably 10 to 15 l/kg of solid.

Therefore, the production of high activity (HA) waste is greatly reduced. The nitric dissolving solution essentially contains actinides and fission products can then be treated in known manner (D').

The liquid phase (B) obtained following solid/liquid separation is then drained in stages by evaporating the water (C) until a dry residue is obtained, which is raised to a temperature equal to or higher than 200° C. (D), in order to completely degrade the aluminate $TMAAlO_2$ in the form of easily eliminatable, volatile, decomposition products (2) and a solid residue.

The solid obtained is then calcined (E) at a temperature of e.g. 500 to 900° C. The thus obtained products are mainly aluminium oxides, fission products, lanthanides and actinides (F).

The calcined mixture of oxides (F) obtained in stage (E) then undergoes a treatment which is a function of its alpha activity and its radioactive element composition (G). If the activity of the oxide mixture is too high (3), a leaching stage (H) may be necessary in order to lower its activity and give a medium activity mixture (4), which is treated in per se known manner, particularly by vitrification, in order to form a final, solid waste (I).

Figure 2:
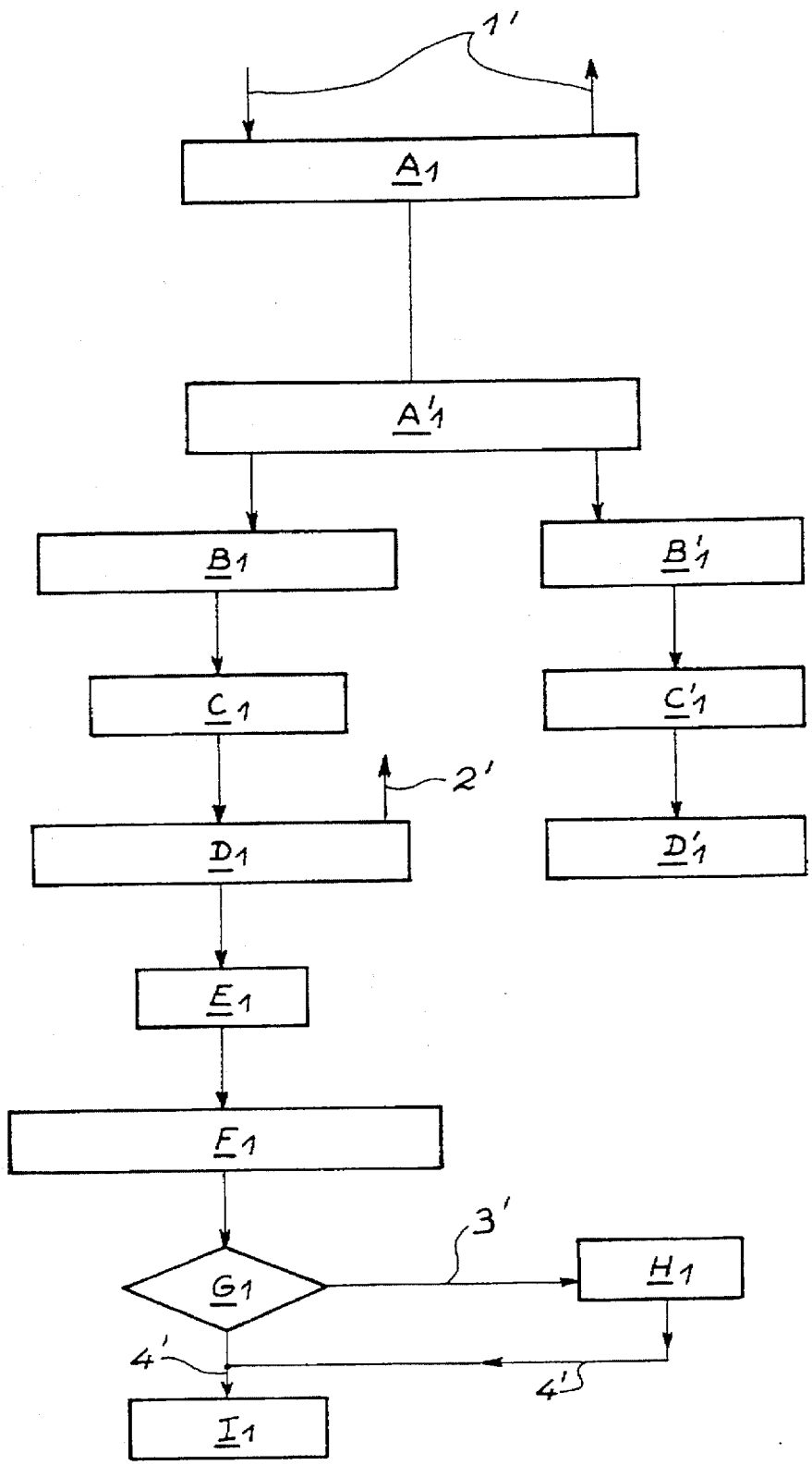
FIG. 2 A diagram representing the stages of the decanning and processing process according to the invention, in its second variant.

FIG. 2 is a diagram showing the stages of the decanning and treatment process according to the second variant of the process of the invention.

In FIG. 2 it is possible to see that the second variant of the process according to the invention firstly involves a first stage ($A_1$) during which the aluminium-based nuclear fuel, which is constituted in conventional manner by an aluminium can and a core containing aluminium, actinides, fission products such as Zr, Nb, Ru and Cs and lanthanides is subject to the action of a solution, preferably an aqueous solution, of tetramethylammonium hydroxide. The fuel subject to decanning preferably comprises by weight 90 to 95% aluminium, 5 to 10% actinides, fission products and lanthanides. The aqueous TMAOH solution preferably has a concentration between 2.5 and 4 mole/liter, the preferred concentration being 4 mole/liter, but a concentration of 3 mole/liter may also be suitable and the solution volume used is generally 5 to 40 liters, preferably 10 to 30 liters and more preferably 15 to 25 liters per kg of treated fuel.

Decanning generally takes place at a temperature between 40 and 95° C., preferably between 70 and 90° C. and the decanning time generally lasts between 10 and 500 minutes, preferably between 20 minutes, e.g. for a temperature of 90° C., and 300 minutes, e.g. for a temperature of 30° C.

All the decanning parameter values are given for information purposes only. It is obvious that the values of these parameters can be easily determined by the expert as a function of the nature of the fuel to be decanned.

Decanning, like dissolving, is preferably performed under gas scavenging (1'), e.g. air or nitrogen scavenging performed on the top of the decanning reactor, in order to limit the dihydrogen quantity present during the decanning of the aluminium, thereby reducing the explosion risks.

The core of the fuel obtained at the end of the decanning stage ($A_1$) is then separated ($A'_1$) from the decanning solution using any adequate separation means. This separation takes place easily, so that a basic liquid phase ($B_1$) is obtained containing the aluminium in the form of aluminate $TMAAlO_2$, at a concentration of 30 to 90 g/liter, together with radioactive elements resulting from the neutron activation of the aluminium alloy of the can and on the other hand the core of the fuel ($B'_1$) containing all the actinides, fission products and aluminium.

The core is preferably dissolved hot in e.g. 6N, concentrated nitric acid ($C'_1$), e.g. under boiling, in the presence of fluoride ions ($NH_4F$, HF). This quantitative dissolving is performed in a nitric acid volume of preferably 50 to 75 liters/kg of solid. This dissolving solution containing actinides, fission products and lanthanides could be treated in known manner ($D'_1$).

The liquid phase ($B_1$) obtained following the core/liquid separation is then treated as in the case of the dissolving in stages $C_1$, $D_1$, $E_1$, $F_1$. The products obtained are aluminium oxides and activation products. The oxide mixture obtained $F_1$ is a medium activity waste, which can then be vitrified ($I_1$).

The following example, given in an illustrative and non-limitative manner, illustrates the results obtained by performing the process of the invention.

EXAMPLE 1

Dissolving takes place of non-irradiated UAL assembly plate sections with an approximate length of 71 mm, a width of 15 mm and a thickness of 1.4 mm for a weight of 4.3 g. The number of aluminium and uranium moles initially present in these plates are respectively equal to $1.5 \cdot 10^{-1}$ mole and $1.5 \cdot 10^{-3}$ mole.

These plates were placed in a three-necked flask equipped with a thermometer, a gas (air) scavenging system and a water circulation condenser. The flask was then filled with an aqueous TMAOH solution and refluxed. As a function of the temperature, a study was made of the dissolving time, namely the time necessary for the disappearance of the plate to be dissolved. The dissolving results are given in table I.

TABLE I

Results of the dissolving of UAL plates by an aqueous 4 mole/l TMAOH solution as a function of the temperature. The dissolving time corresponds to the time necessary for the disappearance of the plate to be dissolved.

| Dissolving conditions | | Solution composition after action | | Solid residue composition | |
| --- | --- | --- | --- | --- | --- |
| temp. °C. | time, min. | Al, % | U, % | Al, % | U, % |
| 90 | 49 | >99 | <0.3 | <1 | >99 |
| 70 | 71 | >98 | <0.3 | <2 | >99 |
| 30 | 675 | 90 | <0.5 | 10 | >99 |

This table shows that the contamination of the solid phase by aluminium and the liquid phase by uranium decreases as the dissolving temperature increases.

Tests carried out using higher TMAOH concentrations indicate that the contamination of the solid phase by aluminium and the liquid phase by uranium decrease as the initial TMAOH concentration in the solution increases.

In the same way, the dissolving kinetics are a function of the temperature and concentration of TMAOH in the solution used.

EXAMPLE 2

Dissolving took place of a fuel plate containing 460 g of aluminium and 40 g of fuel material, using different solutions, namely a nitric solution (8N $HNO_3$), within the framework of a total dissolving process, a sodium solution (5N NaOH) within the framework of a decanning process and a total dissolving process and finally a 4N TMAOH solution and a decanning process. The results appear in table 2 and clearly reveal the advantages of the process according to the invention.

TABLE II

Comparison of the dissolving processes performed for a fuel plate containing 460 g of aluminium and 40 g of "fuel material".

| Solution used | 8 N $HNO_3$ | 5 N NaOH | 5 N NaOH | 4 N TMAOH | 4N TMAOH |
|---|---|---|---|---|---|
| Catalysts | $Hg^{2+}$, F | $NaNO_3$ | $NaNO_3$ | Gas scavenging | Gas scavenging |
| Process | Total dissolving | Decanning | Total dissolving | Decanning | Total dissolving |
| Number of stages | 1 | 2 | 2 | 2 | 2 |
| Stage 1[2] | 10 liters $HNO_3$ HA effluent | 3 l NaOH MA effluent | 6 l TMAOH MA/HA effluent | 4 l TMAOH MA/HA effluent | 7 l TMAOH MA/HA effluent |
| Stage 2 | | 5 l $HNO_3$ HA effluent | 1 l $HNO_3$ HA effluent | 5 l $HNO_3$ HA effluent | 1 l $HNO_3$ HA effluent |
| Advantages | One stage | Aluminium elimination | Al, Cs, I, Zr & Nb elimination; dissolving actinides in a small volume | Aluminium elimination | Al, Cs, I, Zr & Nb elimination, dissolving of actinides in a small volume |
| Disadvantages | Presence of mercury, saline, voluminous HA effluents produced | Saline MA effluents containing sodium produced | Saline MA effluents containing sodium produced, risk of the partial solubilization of actinides, difficult solid-liquid separation | | Risk of partial solubilization of actinides, difficult solid-liquid separation |

HA : High activity
MA : Medium activity
FA : Low activity

We claim:

1. Process for the processing of nuclear targets and/or fuels based on metallic aluminium and radioactive materials in metallic form, in which the nuclear targets and/or fuels undergo at least one dissolving operation, characterized in that the dissolving medium comprises tetramethylammonium hydroxide (TMAOH).

2. Process according to claim 1, characterized in that the nuclear fuel comprises a metallic aluminum can and a core constituted by an intimate mixture of aluminum and radioactive elements.

3. Process according to claim 2, characterized in that the dissolving operation involves a single total dissolving stage for the core and can of nuclear material in the dissolving medium constituted by TMAOH.

4. Process according to claim 2, characterized in that the dissolving operation involves a stage of decanning the can by the dissolving medium constituted by TMAOH, followed by the nitric dissolving of the core.

5. Process according to claim 3, characterized in that the dissolving medium consists of an aqueous TMAOH solution.

6. Process according to claim 4, characterized in that the dissolving medium consists of an aqueous TMAOH solution.

7. Process according to claim 5, characterized in that the TMAOH solution has a concentration of 2.5 to 4.0M.

8. Process according to claim 6, characterized in that the TMAOH solution has a concentration of 2.5 to 4.0M.

9. Process according to claim 5, characterized in that the dissolving solution volume used is 5 to 40 liters per kg of processed fuel.

10. Process according to claim 6, characterized in that the dissolving solution volume used is 5 to 40 liters per kg of processed fuel.

11. Process according to claim 5, characterized in that dissolving takes place at a temperature of 40 to 95° C. for 40 to 800 minutes.

12. Process according to claim 6, characterized in that dissolving takes place at a temperature of 40 to 95° C. for 40 to 800 minutes.

13. Process according to claim 5, characterized in that the product obtained at the end of the dissolving stage undergoes a solid-liquid separation as a result of which is obtained on the one hand a basic liquid phase containing aluminium in the form of aluminate $TMAAlO_2$, as well as fission products soluble in the basic medium and traces of actinides and lanthanides and on the other hand a solid phase essentially containing actinides and lanthanides, as well as a part of the fission products insoluble in the basic medium, in the form of hydroxides and insoluble oxides.

14. Process according to claim 13, characterized in that the solid phase is dissolved in nitric acid at a rate of 10 to 15 liters of nitric acid per kg of insolubles.

15. Process according to claim 6, characterized in that the core of the fuel obtained at the end of the decanning stage is separated by a solid-liquid separation from the decanning solution, by means of which is obtained on the one hand a basic liquid phase containing the aluminum in the form of aluminate $TMAALO_2$, as well as radioactive elements resulting from the neutron activation of the aluminium alloy of the can and on the other hand the core of the fuel containing all the actinides, fission products and aluminum.

16. Process according to claim 15, characterized in that the core is dissolved in nitric acid, at a rate of 50 to 75 liters of nitric acid per kg of solid and in the presence of fluoride ions.

17. Process according to claim 13, characterized in that the liquid phase obtained after solid-liquid separation is then drained in stages by evaporating the water until a dry residue is obtained.

18. Process according to claim 15, characterized in that the liquid phase obtained after solid-liquid separation is then drained in stages by evaporating the water until a dry residue is obtained.

19. Process according to claim 17, characterized in that the dry residue obtained is raised to a temperature equal to or higher than 200° C. in order to degrade the TMAAlO$_2$ in the form of essentially volatile decomposition products, which are eliminated to leave a solid.

20. Process according to claim 19, characterized in that the solid obtained is calcined at a temperature of 500 to 900° C. to give aluminium oxide and oxides of fission products, lanthanides and actinides.

21. Process according to claim 20, characterized in that the calcined mixture of oxides obtained is treated by vitrification, after optionally undergoing a supplementary treatment by leaching if its activity is excessive.

22. Process according to claim 18, characterized in that the dry residue obtained is raised to a temperature equal to or above 200° C. in order to degrade the TMAAlO$_2$ in the form of essentially volatile decomposition products, which are then eliminated to leave a solid.

23. Process according to claim 22, characterized in that the solid obtained is calcined at a temperature of 500 to 900° C. to give the aluminium oxide and oxides of fission products, lanthanides and actinides.

24. Process according to claim 23, characterized in that the calcined mixture of oxides obtained is treated by vitrification after optionally undergoing a supplementary treatment by leaching if its activity is excessive.

* * * * *